United States Patent Office 3,003,246
Patented Oct. 10, 1961

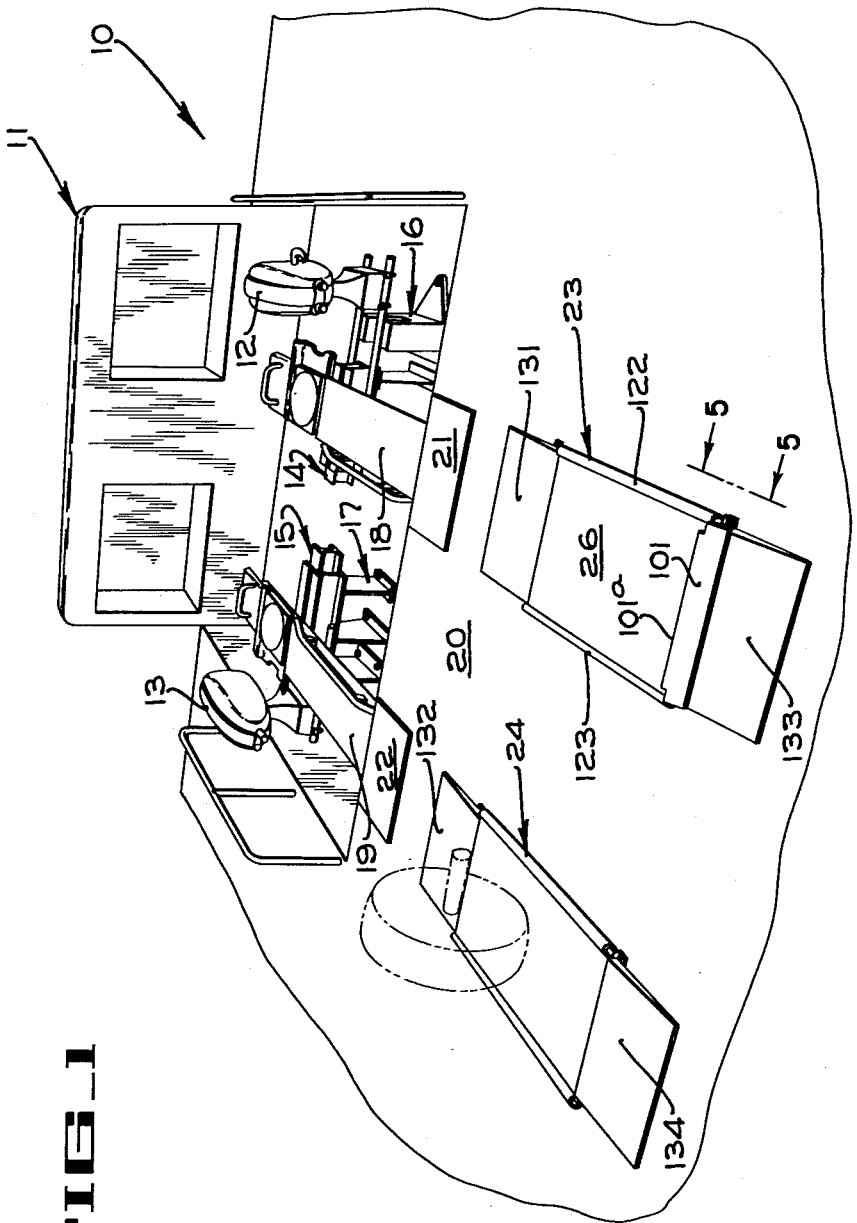

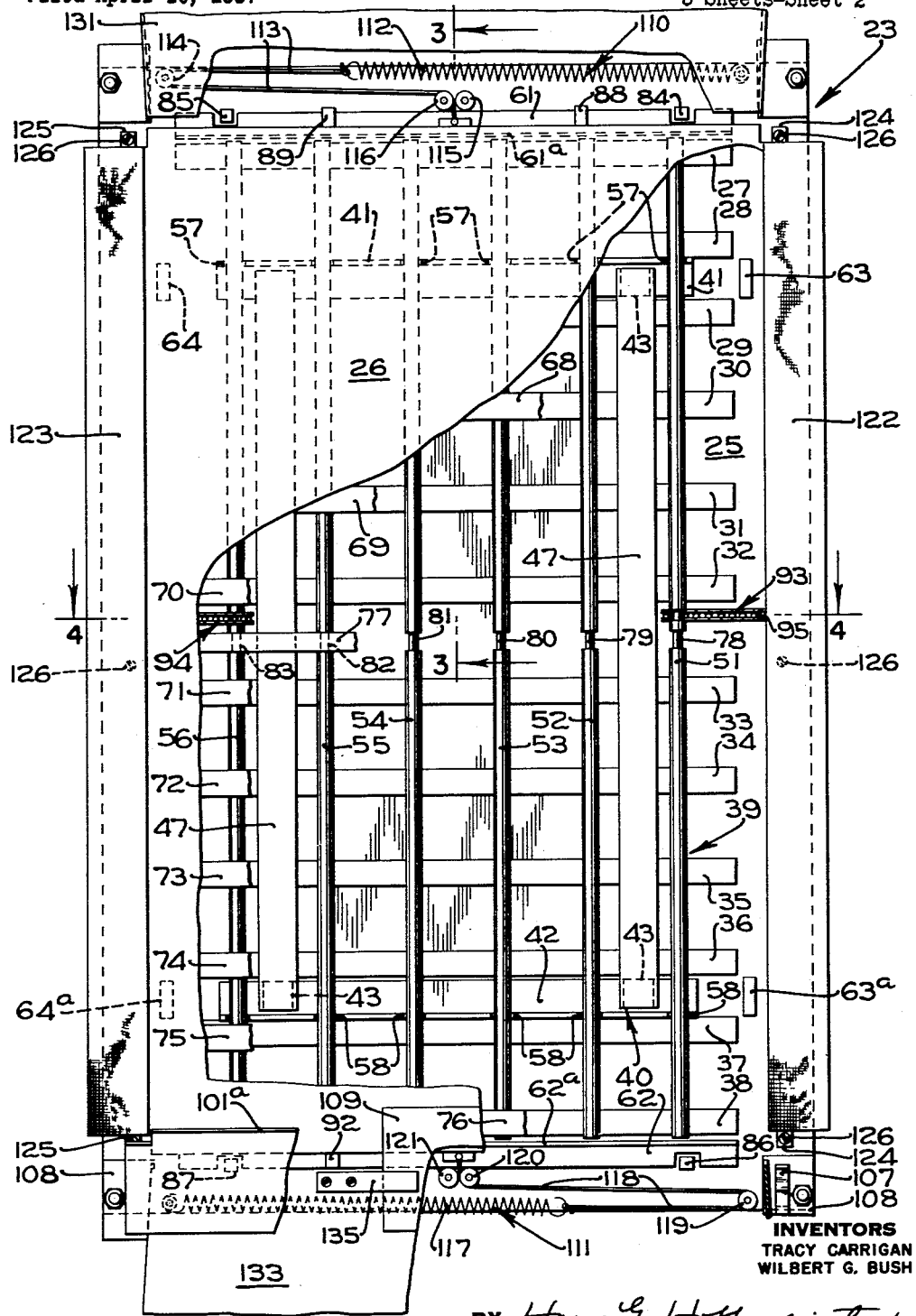

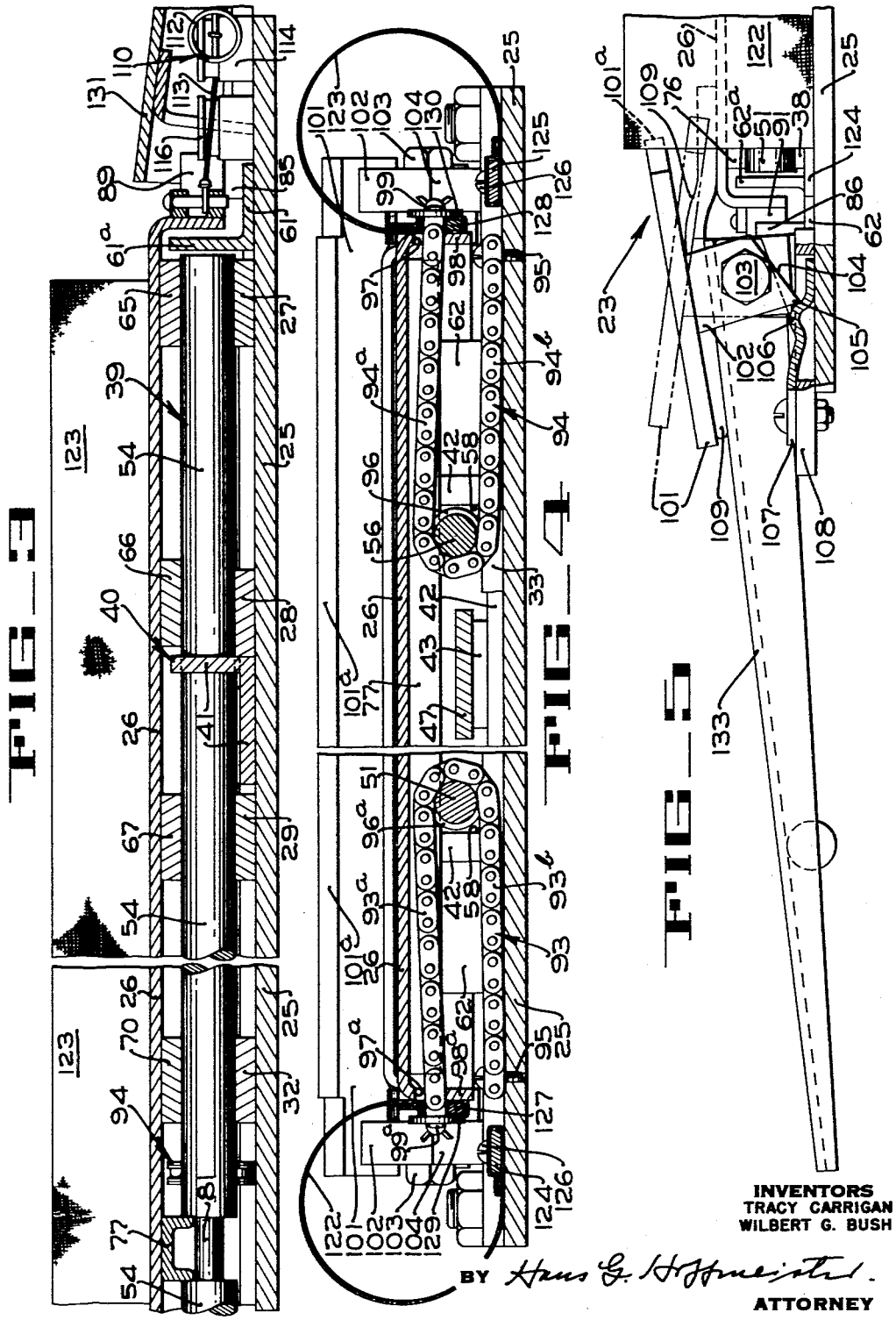

3,003,246
ADJUSTABLE WHEEL SUPPORT FOR WHEEL ALIGNING EQUIPMENT

Tracy Carrigan, Lansing, and Wilbert G. Bush, Perry, Mich., assignors to FMC Corporation, a corporation of Delaware
Filed Apr. 10, 1957, Ser. No. 651,945
7 Claims. (Cl. 33—203.12)

The present invention appertains to automotive servicing equipment and more particularly to an adjustable wheel support for use with wheel aligning equipment.

In checking alignment of the rear wheels of a vehicle and also in aligning a vehicle for centering the steering gear thereof, the position of the vehicle is adjusted so as to align the central axis thereof perpendicular to a reference chart. This is accomplished by moving the rear of the vehicle sidewise, while the front of the vehicle remains in a fixed position with respect to the reference chart.

Accordingly, an object of the present invention is to provide a device for supporting one end of a vehicle for adjusting movement in a direction transverse to the longitudinal centerline of the vehicle.

Another object of the present invention is to provide an adjustable wheel support for use with wheel aligning equipment.

Another object is to provide an automotive wheel aligner that is adaptable for adjusting laterally the position of the rear wheels of a vehicle in order to properly position the vehicle on the wheel aligner with facility and ease of operation.

Another object is to provide an apparatus for use with wheel aligning equipment, which apparatus supports the rear wheels of a vehicle for lateral adjustment independent of the supports for the front wheels of the vehicle, thereby enabling rapid, accurate positioning of the vehicle on the wheel aligning equipment.

Another object is to provide rear wheel supports for use with pit-type wheel aligning equipment, which supports enable on-the-rack lateral adjusting movement of the rear wheels of a vehicle to properly position the vehicle on the wheel aligning equipment.

Another object is to provide an adjustable rear wheel support for use with wheel aligning equipment, which support enables on-the-rack lateral adjusting movement of a rear wheel of a vehicle and is adaptable for locking in the laterally adjusted position until released.

Another object is to provide an adjustable wheel support that has lateral adjusting movement from a central position and returns automatically to its central position upon release.

Another object is to provide an adjustable rear wheel support wherein adequate support is maintained between relatively movable plates while in any adjusted position and during movement to an adjusted position.

Other objects and advantages of the present invention will become apparent from the following description and drawings, in which:

FIG. 1 is a perspective view of the adjustable rear wheel supports of the present invention and illustrated in conjunction with an automotive wheel aligner.

FIG. 2 is a fragmentary plan of an adjustable rear wheel support of the present invention and shown with the top plate thereof partially broken away.

FIG. 3 is an enlarged fragmentary vertical section taken along line 3—3 of FIG. 2.

FIG. 4 is an enlarged fragmentary vertical section taken along line 4—4 of FIG. 2.

FIG. 5 is an enlarged fragmentary side elevation of a portion of one of the wheel supports of FIG. 1 taken looking in the direction indicated by arrows 5—5 of FIG. 1 and having a portion thereof broken away.

A pit-type automotive wheel aligner 10 illustrated in FIG. 1 comprises a reference chart or screen unit 11 supported in a pit directly in front of two optical projection heads 12 and 13 which are adapted to project suitable charts and light beams on the screen unit 11 to indicate the alignment characteristics of the wheels of a vehicle in a manner well known in the art. The projection heads 12 and 13 are supported a suitable distance rearward of the screen unit 11 by I-beam assemblies 14 and 15, respectively, which in turn are supported by base assemblies 16 and 17, respectively, that rest on the floor of the pit. Front wheel supports or runways 18 and 19 are mounted on the I-beam assemblies 14 and 15, respectively, and are disposed inwardly of the projection heads. The front wheel supports 18 and 19 are elongated members which extend longitudinally relative to the aligner 10 and have the rearward extremities thereof adjacent an upper level such as a garage floor 20. Approach plates 21 and 22 are disposed rearwardly of and adjacent to the front wheel supports 18 and 19, respectively, and are supported on the garage floor.

For providing lateral adjustment for a vehicle serviced by the aligner 10 in order to align the central axis of the vehicle perpendicular to the screen unit 11, a pair of laterally adjustable rear wheel supports 23 and 24 are spaced a suitable distance rearward of and in longitudinal alignment with the front wheel supports 18 and 19, respectively, so as to accommodate an automotive vehicle and to provide support therefor during servicing by the aligner 10.

The rear wheel support 24 is similar in construction to the rear wheel support 23 with the exception that a locking device is employed by the rear wheel support 23, which locking device will be described in detail hereinafter. Accordingly, a description of the adjustable rear wheel support 23 will suffice for the purpose of the present disclosure.

As shown in FIGS. 2 and 3, the adjustable rear wheel support 23 comprises an elongated lower base plate 25 and an elongated upper tread plate 26. The lower base plate 25 may be anchored to the garage floor 20 and comprises a plurality of flat bars 27 to 38, inclusive, which are fixedly secured to the upper surface thereof and extend transversely thereof in spaced parallel relation. Disposed between the tread plate 26 and the base plate 25 is a roller assembly 39 which includes a generally rectangular frame 40 having two longitudinally spaced transverse angle members 41 and 42 connected by two transversely spaced flat members 47. At each point where one of the members 47 is connected to either of the transverse angle members 41 or 42, a spacer block 43 is welded in position between the members. The height of each spacer block 43 is such that the members 47 of the roller assembly 39 do not rest upon or come into contact with the transverse bars 27 to 38, inclusive.

The roller assembly 39 also includes a series of longitudinally extending rollers 51 to 56, inclusive, which are journalled for rotary movement within transversely spaced notches 57 in the upright portion of the angle member 41 and within notches 58 in the upright portion of the angle member 42, respectively. Notches 57 of angle member 41 are aligned longitudinally of the rollers with the complementary notches 58 of the angle members 42 and are so arranged in depth that the rollers 51 to 56, inclusive, are in contact with the transverse bars 27 to 38, inclusive.

To restrict the longitudinal movement of the rollers 51 to 56, inclusive, longitudinally spaced transverse angle members 61 and 62 are fixedly secured to the base member 25. Angle member 61 (FIG. 3) has an upstanding flange 61a disposed adjacent the forward end of the rollers 51 to 56, inclusive, to prevent excessive longitudinal movement thereof in the forward direction, while angle member 62 has a flange 62a (FIG. 2) disposed adjacent the rearward end of the rollers 51 to 56, inclusive, to prevent excessive longitudinal movement thereof in the rearward direction. In order to limit the transverse movement of the roller assembly 39 relative to the base plate 25, four stop members 63, 63a, 64 and 64a are fixed to the base plate 25 near the four corners thereof. The stop members 63 and 63a are positioned a predetermined lateral distance to the right of and in alignment with the ends of the angle members 41 and 42, respectively, as viewed in FIG. 2, to arrest the lateral movement of the roller assembly 39 from left to right, while stop members 64 and 64a are positioned an equal predetermined lateral distance to the left of the angle members 41 and 42, respectively, as also viewed in FIG. 2, to arrest the lateral movement of the roller assembly 39 from right to left.

A plurality of flat bars 65 to 76, inclusive, (FIGS. 2 and 3) are fixedly secured in transversely extending parallel position on the undersurface of the tread plate 26 to form a rigid tread plate assembly. The flat bars 65 to 76, inclusive, rest upon the rollers 51 to 56, inclusive, and accordingly, the tread plate 26 is arranged for transverse movement relative to the stationary base plate 25 as the rollers advance along the flat bars 27 to 38 of the base plate. For preventing excessive longitudinal movement of the tread plate 26 relative to the roller assembly 29, a transverse channel guide member 77 (FIG. 3) is fixedly secured to the undersurface of the tread plate 26 in parallel relation to the bars 65 to 76, inclusive, and rests upon reduced diameter portions 78 to 83, inclusive (FIG. 2), of the rollers 51 to 56, respectively. Each of the reduced diameter portions, located substantially midway between the ends of its associated roller, constitutes a relatively narrow channel guide groove for restricting the longitudinal movement of the channel guide member 77.

To limit the transverse movement of the tread plate 26 relative to the stationary base plate 25, the base plate 25 has fixedly secured thereto upright stop members 84 to 87, inclusive, (FIG. 2). The stop members 84 and 85 are disposed in spaced, transversely aligned relation at the forward portion of the base plate 25 and project upward through suitable slots in the angle member 61. Similarly, the stop members 86 and 87 are disposed at the rearward portion of the base plate 25 and project upward through suitable slots in the angle member 62. A pair of abutment members 88 and 89 are fixed to the forward end of the tread plate 26 as outwardly and forwardly directed projections therefrom and are disposed intermediate the stops 84 and 85. Abutment members 91 and 92 are fixed to the rearward end of the tread plate 26 as outwardly and rearwardly directed projections therefrom in longitudinally aligned relationship with the abutment members 88 and 89, respectively, and are disposed intermediate the stop members 86 and 87. The stop members 84 and 85 are so constructed as to be engageable by the abutment members 88 and 89, respectively. Similarly, the stop members 86 and 87 are so constructed as to be engageable by the abutment members 91 and 92, respectively. Accordingly, the lateral movement of the tread plate 26 relative to the fixed base plate 25 from left to right, as viewed in FIG. 2, is arrested when the abutment members 88 and 91 engage the stop members 84 and 86, respectively. In a similar manner, the lateral movement of the tread plate 26 relative to the fixed base plate 25 from right to left, as viewed in FIG. 2, is arrested when the abutment members 89 and 92 engage the stop members 85 and 87, respectively.

As previously described, the roller assembly 39 is supported by the stationary base plate 25 and has lateral movement relative thereto. The tread plate 26 rests upon the roller assembly 39 and has simultaneous lateral movement relative to the roller assembly and to the stationary base plate 25. Since the tread plate 26 supports the rear wheel of a vehicle, it is necessary to provide adequate support therefor under any adjusted position or movement. This is accomplished by retaining the roller assembly 39 in position directly under the tread plate 26 to render maximum support for the tread plate 26. For this purpose, a pair of transversely aligned flexible members or chains 93 and 94 (FIG. 2) are provided. Each chain is secured at one end to the base plate 25 by suitable means such as screw 95 (FIG. 4). The chain 94 is trained around the roller 56 and engages a reduced diameter portion 96 thereof (FIG. 4). At the other end thereof, the chain 94 is received by a suitable opening 97 in a downwardly directed flange 98 of the tread plate 26 and is secured thereto by a cotter pin 99. The chain 93 on the opposite side of the roller assembly is trained around the roller 51, which has a reduced diameter portion 96a similar to reduced diameter portion 96 of roller 56. At the other end thereof, the chain 93 is received by a suitable opening 97a in a downwardly directed flange 98a of the tread plate 26, which flange is oppositely located from and similar to the flange 98. The chain 93 is secured thereto by a cotter pin 99a. The end portions of the chain 93 are directed in opposite directions with respect to the end portions of chain 94. Accordingly, when the tread plate 26 is moved laterally from right to left, as viewed in FIG. 4, the upper portion 93a of chain 93 travels with the tread plate 26 and increases in length, while the lower portion 93b, which is secured to the stationary base plate 26, decreases in length. This action causes the chain 93 to move the roller 51 in the direction of movement of the tread plate 26, thus moving the roller assembly 39 therewith. The chain 94 remains taut under the action of roller 56, since the roller 56 travels with the roller assembly 39 to cause the upper portion 94a of chain 94 to decrease in length and to cause the lower portion 94b of chain 94 to increase in length. When the tread plate 26 is moved laterally from left to right, as viewed in FIG. 4, the upper portion 94a of chain 94 travels with the tread plate 26 and increases in length, while the lower portion 94b of chain 94 decreases in length, thereby causing the roller 56, and with it the roller assembly 39, to move in the direction of movement of the tread plate 26. The chain 93 remains taut under the action of roller 51, which moves with the roller assembly 39, to cause the upper portion 93a of chain 93 to decrease in length and to cause the lower portion 93b of chain 93 to increase in length.

After the tread plate 26 is displaced relative to the base plate 25 for lateral adjustment of a rear wheel of a vehicle, it is releasably locked in its adjusted position until completion of the wheel aligning operations. For this purpose, a laterally extending locking plate 101 (FIGS. 1 and 5) is provided, which extends transversely along the rearward portion of the tread plate 26 of the rear wheel support 23. Depending from each end of the lock plate 101 in fixed relation is an arm 102 (FIG. 5). The arms 102 are transversely spaced and include suitable apertures, which receive bolts 103 for pivotally mounting the lock plate 101 to an approach plate, which will be described hereinafter. Each arm 102 includes a lower edge 104 inclined from the horizontal to form a detent 105 at the rearward portion thereof. The detent 105 contacts an upstanding bead 106 of a spring 107, which bead is curved and has a sinuous configuration. Each spring 107 is secured at the rearward end thereof to a plate 108 which, in turn, is fixed to the base plate 25. When the lock plate 101 is horizontal, the detent 105 contacts approximately the highest point on the bead 106 of the spring 107. When the lock plate 101 is moved clockwise from the horizontal (as shown in FIG. 5 in broken lines), the transverse edge 101a of the lock plate 101 approaches engagement with the tread plate 26. The detent 105 of lever 102 contacts the rearward side of the bead 106 enabling the spring 107 to urge the lock plate in the clockwise pivoted position. A resilient pad 109 is disposed between the tread plate 26 and lock plate 101 to increase the frictional engagement therebetween for retaining the tread plate 26 in locked position. When the lock plate 101 is moved counterclockwise from the horizontal (as shown in FIG. 5 in solid lines), the edge 101a of the lock plate 101 moves away from the tread plate 26. The detent 105 of the lever 102 contacts the forward side of the bead 106 enabling the spring 107 to urge the lock plate 101 in the counterclockwise direction.

Prior to lateral adjusting displacement, the tread plate 26 is centrally disposed with respect to the longitudinal sides of the base plate 25. To automatically return the tread plate 26 from a laterally displaced position to its central position upon release of the locking plate, tread plate centering devices 110 and 111 (FIG. 2) are provided. The tread plate centering device 110 is disposed adjacent the forward edge of the tread plate 26 (FIG. 2) and comprises a transversely extending spring 112 (FIG. 2) which is fixedly secured at one end to the base plate 25 and at the other end thereof it is connected to one end of a flexible cable 113. The flexible cable 113 is trained around a pulley 114, which is secured to the base plate 25. The cable 113 is received in guided relation between two pulleys 115 and 116, which are secured to the base plate 25 and are positioned substantially midway between the longitudinal sides of the base plate 25. The other end of the cable 113 is secured to the tread plate 26 at a point midway between the longitudinal sides of the tread plate 26. In a similar manner, the centering device 111 (FIG. 2) is disposed adjacent the rearward edge of the tread plate 26 and comprises a transversely extending spring 117 fixedly secured at one end to the base plate 25. At the free end thereof the spring 117 is connected to one end of a flexible cable 118, which is trained around a pulley 119. The pulley 119 is secured to the base plate 25. The other end of the flexible cable 118 is received in guided relation between two pulleys 120 and 121, which are secured to the base plate 25 and positioned substantially midway between the longitudinal sides of the base plate 25. The cable 118 is secured to the tread plate 26 midway between the longitudinal sides thereof. To provide a balanced and smooth return movement for the tread plate 26, the fixed end of the spring 112 is disposed at a diagonally opposite portion of the plate 25 from the fixed end of spring 117. Thus, when lateral movement is imparted to the tread plate 26 to cause displacement thereof from its central position, cables 113 and 118 travel with the tread plate 26 to tension springs 112 and 117, respectively. Upon removing the rear wheel of a vehicle from the tread plate 26, and unlocking the tread plate 26, the tread plate automatically returns to its central position due to the pull of the tensioned springs 112 and 117 transmitted through the cables 113 and 118, respectively.

For preventing dirt, liquid or other foreign objects from impairing the operation of the roller assembly 39, water repellent flexible shields 122 and 123 (FIG. 1) are provided, which are made of suitable material such as canvas. The lower portions of shields 122 and 123 are retained in position relative to the base plate 25 adjacent the longitudinal sides thereof, respectively, by suitable means such as lower bars 124 and 125 (FIG. 4). Each lower bar is fixed to the base plate 25 by screws 126 (FIG. 4), and is received by a lower hemmed pocket formed in the associated canvas shield to secure the lower portion of the shield to the base plate 25. Upper hemmed pockets are also included in the canvas shields 122 and 123, which receive upper bars 127 and 128, respectively, (FIG. 4). The upper bar 127 is fixed to the tread plate 26 by suitable screws, not shown, between the flange 98a and a washer 129 (FIG. 4), and includes a suitable slot to permit the chain 93 to pass therethrough. Similarly, upper bar 128 is fixed to the tread plate 26 between the flange 98 and a washer 130, and includes a suitable slot to permit the chain 94 to pass therethrough. Hence, the upper pockets of the canvas shields are fixed to the tread plate 26 and move therewith. Since the canvas shields are flexible, they do not interfere with the lateral movement of the tread plate 26 relative to the base plate 25.

Adjacent the forward edges of the support structures 23 and 24 are disposed suitable ramps 131 and 132, respectively, and adjacent the rearward edges of the support structures 23 and 24 are positioned suitable approach plates or ramps 133 and 134. The ramp 133 at the forward end thereof has suitable apertures to receive the bolts 103 for pivotally mounting the lock plate 101. The previously mentioned resilient pad 109, which is disposed between the lock plate 101 and tread plate 26, is secured to the ramp 133 by suitable means, such as clamps 135.

In the use of the adjustable rear wheel supports 23 and 24 of the wheel aligning equipment 10, a vehicle is driven onto the tester with the front wheels thereof resting on the runways 18 and 19, and the rear wheels resting upon the supports 23 and 24 with the axis of rotation of the rear wheels substantially transverse thereto (FIG. 1). An operator moves the rear of the vehicle laterally until the rear wheels have the desired orientation relative to the front wheels. As this is being done, the tread plates, which rest upon the roller assemblies, move in a generally transverse direction with respect to the base plates and with respect to the longitudinal axis of the vehicle. The roller assembly 39 is also moved transversely. When the desired position of the rear wheels is obtained, the operator pivots the lock plate 101 of support 23 forwardly to lock the tread plate 26 in its adjusted position. After the wheel aligning process is completed, the vehicle is removed from the runways 18, 19 and the supports 23, 24. Thereupon, the lock plate 101 is pivoted rearwardly to unlock tread plate 26. The tread plates of the rear wheel supports 23 and 24 are automatically returned to their central position.

While the present invention has been described in conjunction with a pit-type wheel aligner, it is to be understood that it is also adaptable to be used with runways of the elevated type of aligning equipment. Although the disclosure hereof describes the present invention as adaptable for use in aligning the central axis of a vehicle perpendicular to a screen of a projector, it is evident that the adjustable wheel supports of the present invention can be used with other types of wheel aligning equipment or automotive servicing equipment wherein the wheels of a vehicle require lateral adjustment in order to properly position a vehicle for servicing.

It will be understood that modifications and variations of the embodiments of the invention disclosed herein may be resorted to without departing from the spirit of the invention and the scope of the appended claims.

Having thus described our invention, what we claim as new and desire to protect by Letters Patent is:

1. A device for supporting a wheel of a vehicle comprising a pair of relatively movable plates, one of said plates being adapted to receive thereon an automobile wheel, a roller assembly disposed between said plates, said roller assembly including a plurality of rollers engaging said plates to support said one plate for movement relative to the other of said plates, and a flexible member interconnecting said plates and trained around one of said rollers to cause movement of said roller assembly as said one plate is moved relative to said other plate to maintain said roller assembly in supporting position relative to said plates.

2. A device for supporting a wheel of an automobile comprising a stationary plate, a movable plate disposed above said stationary plate and adapted to receive thereon an automobile wheel with the axis of rotation of the wheel extending in a predetermined direction, a roller assembly disposed between said plates, said roller assembly including a plurality of rollers engaging said plates and having the axes thereof generally perpendicular to said predetermined direction to support said movable plate for movement relative to said stationary plate in substantially said predetermined direction, and a flexible member trained around one of said rollers and having an upper portion secured to said movable plate and having a lower portion secured to said stationary plate, whereby movement of said movable plate increases the length of said upper portion while decreasing the length of said lower portion to cause said one roller to move said roller assembly in the direction of movement of said movable plate for maintaining said roller assembly in position for supporting said movable plate.

3. A device for supporting a wheel of a vehicle comprising a pair of relatively movable plates, one of said plates being adapted for receiving thereon an automotive wheel, means disposed between said plates for supporting one of said plates for movement relative to the other of said plates, a releasable lock plate pivotally mounted for selective movement into or out of engagement with said one plate, and means carried by said other plate for engagement with said lock plate and arranged after said lock plate is in either one of said selective positions for continuously urging said lock plate toward said one position.

4. A device for supporting a wheel of a vehicle comprising a stationary plate, a movable plate disposed above said stationary plate and arranged for receiving thereon an automotive wheel, means disposed between said plates for supporting said movable plate for movement relative to said stationary plate, a releasable lock plate adapted for selective movement into or out of engagement with said movable plate, an arm depending from said lock plate and having a detent at the lower extremity thereof, means pivotally supporting said arm for moving said lock plate to selective positions, and a spring carried by said stationary plate having a bead in engagement with said detent and arranged to continuously apply pressure to said detent after said lock plate is in one of said selective positions to maintain said lock plate in said one position.

5. A device for supporting a wheel of an automobile comprising a stationary plate, a movable plate disposed above said stationary plate and adapted to receive thereon an automotive wheel with the axis of rotation of the wheel extending in a predetermined direction, means disposed between said plates for supporting said movable plate for movement relative to said stationary plate, a lock plate disposed in a direction parallel to said predetermined direction and adapted for selective movement into or out of engagement with said movable plate, arms depending from said lock plate, each of said arms having a detent at the lower extremity thereof, means pivotally supporting said arms for movement of said lock plate to its selective positions, and a spring carried by said stationary plate adjacent each of said detents and having an upstanding bead in engagement with its associated detent and arranged after said lock plate is in one of said selective positions for continuously urging said lock plate into said one position.

6. A device for supporting a wheel of an automobile comprising a stationary rectangular plate, a movable rectangular plate disposed above said stationary plate and adapted to receive thereon an automobile wheel, means disposed between said plates to support said movable plate for movement relative to said stationary plate from an initial position to an adjusted position, said movement being in the direction in which one pair of opposite edges of said rectangular movable plate extend, a spring disposed adjacent one of said edges and having one end thereof operatively connected to said stationary plate, a cable interconnecting the other end of said spring with said one edge, means including a cable guide member disposed in fixed position directly opposite the point of connection of said cable to said one edge when said movable plate is in said initial position for guiding said cable to tension said spring when said movable plate is moved to its adjusted position and further guiding said cable so that force transmitted from said spring through said cable urges said movable plate to return to its initial position with said point of connection opposite said cable guide member, a second spring disposed adjacent the other of said movable plate edges and having one end thereof operatively connected to said stationary plate, a second cable interconnecting the other end of said spring with said other edge, and means including a second cable guide member disposed in fixed position directly opposite the point of connection of said cable to said one edge for guiding said second cable to tension said second spring when said movable plate is moved to its adjusted position and further guiding said second cable so that force transmitted from said second spring through said second cable urges said movable plate to return to its initial position with said point of connection opposite said second cable guide member.

7. A device for supporting a wheel of a vehicle comprising a stationary plate, a movable plate disposed above said stationary plate and arranged for receiving thereon an automobile wheel, means disposed between said plates for supporting said movable plate for movement relative to said stationary plate, a releasable lock plate adapted for selected movement into or out of engagement with said movable plate, an arm depending from said lock plate and having a detent at the lower extremity thereof, means pivotally supporting said arm for moving said lock plate to selected positions, and a spring disposed adjacent said lock plate and having a bead in engagement with said detent and arranged to continuously apply pressure to said detent after said lock plate is in one of said selected positions to maintain said lock plate in said one selected position.

References Cited in the file of this patent

UNITED STATES PATENTS

| | | |
|---|---|---|
| 848,578 | Thelin | Mar. 26, 1907 |
| 1,047,661 | Landstra | Dec. 17, 1912 |
| 1,487,759 | Skinner | Mar. 25, 1924 |
| 1,831,198 | Sandberg | Nov. 10, 1931 |
| 1,846,414 | Casler et al. | Feb. 23, 1932 |
| 1,878,664 | Bennett | Sept. 20, 1932 |
| 1,971,388 | Scruby | Aug. 28, 1934 |
| 2,006,788 | Casler et al. | July 2, 1935 |
| 2,091,656 | Smalley | Aug. 31, 1937 |
| 2,124,902 | Bells | July 26, 1938 |
| 2,155,876 | Stout | Apr. 25, 1939 |
| 2,250,742 | Bennett | July 29, 1941 |
| 2,503,580 | Fontaine | Apr. 11, 1950 |
| 2,524,576 | Smith | Oct. 3, 1950 |
| 2,551,860 | Welte et al. | May 8, 1951 |
| 2,674,293 | Elam | Apr. 6, 1954 |
| 2,676,415 | Love | Apr. 27, 1954 |
| 2,687,271 | Carter | Aug. 24, 1954 |

FOREIGN PATENTS

| | | |
|---|---|---|
| 751,469 | France | June 19, 1933 |